United States Patent
Matsuda et al.

(10) Patent No.: US 8,399,583 B2
(45) Date of Patent: Mar. 19, 2013

(54) POLYMER, CURABLE RESIN COMPOSITION, CURED PRODUCT, AND ARTICLE

(75) Inventors: Yasuhiro Matsuda, Suita (JP); Osamu Konosu, Suita (JP)

(73) Assignee: Nippon Shokubai Co., Ltd., Osaka (JP)

( * ) Notice: Subject to any disclaimer, the term of this patent is extended or adjusted under 35 U.S.C. 154(b) by 371 days.

(21) Appl. No.: 12/921,042

(22) PCT Filed: Mar. 4, 2009

(86) PCT No.: PCT/JP2009/054063
§ 371 (c)(1),
(2), (4) Date: Sep. 3, 2010

(87) PCT Pub. No.: WO2009/110503
PCT Pub. Date: Sep. 11, 2009

(65) Prior Publication Data
US 2011/0009586 A1    Jan. 13, 2011

(30) Foreign Application Priority Data
Mar. 5, 2008  (JP) ................................ 2008-055307

(51) Int. Cl.
C08F 24/00 (2006.01)
C08F 22/20 (2006.01)
(52) U.S. Cl. ...................... 526/270; 526/266
(58) Field of Classification Search .................. 526/270, 526/266
See application file for complete search history.

(56) References Cited

U.S. PATENT DOCUMENTS

| | | | |
|---|---|---|---|
| 2,443,496 A * | 6/1948 | Flodin .............................. 525/62 |
| 5,710,225 A | 1/1998 | Johnson et al. | |
| 6,191,229 B1 | 2/2001 | Sasabe et al. | |
| 6,384,146 B1 * | 5/2002 | Ruckenstein et al. ........ 525/242 |
| 6,775,838 B2 | 8/2004 | Hayashida et al. | |
| 7,132,460 B2 | 11/2006 | Fujimoto et al. | |
| 7,341,771 B2 | 3/2008 | Fujimoto et al. | |
| 7,344,768 B2 | 3/2008 | Fujimoto et al. | |
| 2002/0072009 A1 | 6/2002 | Kim et al. | |
| 2003/0215758 A1 | 11/2003 | Kim et al. | |
| 2004/0246884 A1 | 12/2004 | Komaki et al. | |
| 2005/0191410 A1 | 9/2005 | Itoh et al. | |
| 2006/0194935 A1 | 8/2006 | Aoshima et al. | |
| 2007/0037962 A1 | 2/2007 | Ueda et al. | |

FOREIGN PATENT DOCUMENTS

| | | |
|---|---|---|
| GB | 2032939 A | 5/1980 |
| JP | S47-017888 | 9/1972 |
| JP | S47-022490 | 10/1972 |
| JP | S49-013212 | 3/1974 |
| JP | S52-045597 A | 4/1977 |
| JP | S55-062976 A | 5/1980 |
| JP | 02-003404 A | 1/1990 |
| JP | 03-049306 A | 3/1991 |
| JP | 3178733 A | 8/1991 |
| JP | 5-310832 A | 11/1993 |
| JP | H10-087722 A | 4/1998 |
| JP | 2001-122816 A | 5/2001 |
| JP | 2001-151814 A | 6/2001 |
| JP | 2002-157782 A | 5/2002 |
| JP | 2002-236365 A | 8/2002 |
| JP | 2003-040943 A | 2/2003 |
| JP | 2003-137945 A | 5/2003 |
| JP | 2003-162847 A | 6/2003 |
| JP | 2003-327631 A | 11/2003 |
| JP | 2004-093947 A | 3/2004 |
| JP | 2004-152418 A | 5/2004 |

(Continued)

OTHER PUBLICATIONS

International Search Report of PCT/JP2009/054063 dated Mar. 31, 2009.

*Primary Examiner* — Ling Choi
(74) *Attorney, Agent, or Firm* — Novak Druce Connolly Bove + Quigg LLP

(57) ABSTRACT

A polymer which has a radical polymerizable unsaturated group in a side chain and can be made a molecular design suitable for the purpose; a curable resin composition containing the polymer, which provides a cured product having high surface hardness after curing and hardly suffering from scratch; the cured product; and an article obtained by laminating the cured product are provided.

The polymer (A) of the present invention is obtained by polymerizing, at least, a vinyl monomer represented by the following general formula (1) and a cyclic ether compound represented by the following general formula (2).

The polymer (A) of the present invention is preferably obtained by polymerization of 1 wt % or more and 99.9 wt % or less of a vinyl monomer represented by the general formula (1), 0.1 wt % or more and 99 wt % or less of a cyclic ether compound represented by the general formula (2) and 0 wt % or more and 98.9 wt % or less of the other cationic polymerizable monomer.

(Chemical formula 1)

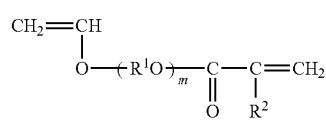

(1)

[wherein $R^1$ represents an alkylene group having 2 to 8 carbon atoms, $R^2$ represents a hydrogen atom or a methyl group, and m represents a positive integer]

(Chemical formula 2)

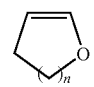

(2)

[wherein n represents an integer of 1 to 5].

16 Claims, No Drawings

FOREIGN PATENT DOCUMENTS

| | | |
|---|---|---|
| JP | 2004-224841 A | 8/2004 |
| JP | 2005-152751 A | 6/2005 |
| JP | 2005-158253 A | 6/2005 |
| JP | 2005-234554 A | 9/2005 |
| JP | 2005-239919 A | 9/2005 |
| JP | 2006-152268 A | 6/2006 |
| JP | 2006-188659 A | 7/2006 |
| JP | 2006-241189 A | 9/2006 |
| JP | 2007-070607 A | 3/2007 |
| JP | 2007-091977 A | 4/2007 |
| JP | 2008-214452 A | 9/2008 |
| JP | 2009-084432 A | 4/2009 |
| JP | 2009-096857 A | 5/2009 |
| JP | 2009-242470 A | 10/2009 |
| WO | WO-9712918 A1 | 4/1997 |

* cited by examiner

POLYMER, CURABLE RESIN COMPOSITION, CURED PRODUCT, AND ARTICLE

CROSS REFERENCE TO RELATED APPLICATIONS

This application is a National Phase filing under 35 U.S.C. §371 of PCT/JP2009/054063 filed on Mar. 4, 2009; and this application claims priority to Application No. 2008055307 filed in France on Mar. 5, 2008 under 35 U.S.C. §119; the entire contents of all are hereby incorporated by reference.

TECHNICAL FIELD

The present invention relates to a polymer having a radical polymerizable unsaturated group in a side chain, a curable resin composition containing the polymer, which enables formation of a cured film having excellent low warpage property, abrasion resistance and adhesion when, for example, applied on a plastic base material and cured and laminated thereon, a cured product obtained by curing the curable resin composition, and an article obtained by laminating the cured product.

BACKGROUND ART

A polymer of a vinyl ether-type monomer can be produced usually by carrying out a polymerization reaction by a cationic polymerization method. Particularly, polymers of alkyl vinyl ethers are used for, for example, a tackiness agent, tackifier, adhesive, softener, paint, leather paint, fabric finishing compound, synthetic rubber modifier and the like.

A vinyl ether-based polymer is produced, in generally, by cationic polymerization of an alkyl vinyl ether using a Lewis acid polymerization catalyst (hereinafter, referred to as Lewis acid catalyst). In this cationic polymerization, usually, a compound having lone pair of electrons such as water, alcohol, acid, ether, halogen compound and the like is used as a co-catalyst. The degree of polymerization is controlled by the use amount of the polymerization catalyst and the co-catalyst, and the polymerization temperature, and the like. Specifically, there is a production method in which a desired alkyl vinyl ether is cation-polymerized in the presence of a co-catalyst such as an alcohol or the like, and a Lewis acid catalyst such as a boron trifluoride complex, anhydrous aluminum chloride or the like, then, the catalyst is deactivated to stop reacting, so, the vinyl ether polymer is obtained (for example, patent document 1 and the like).

However, in the case of carrying out cationic polymerization in the presence of the above-described Lewis acid-type catalyst, a low molecular weight polymer having a molecular weight of about several hundred, a so-called oligomer, is often obtained. In the case of production by a cationic polymerization method, a polymer having higher molecular weight is obtained generally by carrying out the reaction at lower temperature, however, it is known that, for obtaining a polymer having a molecular weight of several thousand or more, setting of the reaction condition to adjust the reaction temperature to 0° C. or lower, in some cases, causing a disadvantage for manufacturing in industrial level. It is difficult to obtain a high molecular weight polymer, and a molecular design in accordance with the purpose thereof is difficult as compared with an anionic polymerization method and a radical polymerization method, thus, its applicable use is limited.

As a method to get a high molecular weight polymer by a cationic polymerization, there is suggested a living cationic polymerization or the like. Patent document 2 discloses a method of carrying out living cationic polymerization of α-methylstyrene using a polymerization initiator composed of a specific organic halogen compound and a halogenated metal having Lewis acidity. Patent document 3 suggests a method of carrying out living cationic polymerization in the presence of a Lewis acid such as an organoaluminum complex, a tin complex and the like. However, in the living cationic polymerization method as described above, industrial manufacturing is difficult since a very highly active metal complex is usually used as the Lewis acid catalyst.

On the other hand, for obtaining a polymer having a radical reactive unsaturated group in a side chain, use is made of a method of introducing an unsaturated group into a polymer, by reacting a polymer having a reactive functional group in a side chain with an unsaturated compound having a substituent which is capable of reacting with this reactive side chain functional group. Typically mentioned are (1) a method of introducing an unsaturated group by an acid epoxy reaction using an epoxy group-containing unsaturated compound such as glycidyl (meth)acrylate and the like, (2) a method of introducing an unsaturated group by a urethane reaction using an unsaturated compound having an isocyanate group, (3) a method of introducing an unsaturated group by an esterification reaction of a carboxylic acid and a hydroxyl group, or an amidation reaction of a carboxylic acid and an amine group, and the like.

However, in the case of production of the above-described polymer by the above-described methods (1) to (3), a radical reactive unsaturated group is not introduced completely into a side chain, and a substituent having reactivity remains also after addition of a radical reactive unsaturated group, and depending on its use, there is a possibility of exerting a bad influence, and the number of processes increases, causing a problem in productivity, in some cases.

(Patent document 1) Japanese Patent Application Laid-Open (JP-A) No. 2001-122816

(Patent document 2) JP-A No. 5-310832

(Patent document 3) JP-A No. 2007-91977

DISCLOSURE OF THE INVENTION

Problem to be Solved by the Invention

The present invention has been made in view of the above-described conditions, and has an object of providing a polymer which has a radical polymerizable unsaturated group in a side chain and can be made a molecular design suitable for the purpose, by cationic copolymerization of a monomer having a functional group polymerizable by a cationic polymerization method and further having a radical polymerizable unsaturated group with a monomer having a cyclic ether structure, and providing a curable resin composition containing this polymer, a cured product obtained by curing this curable resin composition, and an article obtained by laminating this cured product on a base material. Here, "cured product" means a material having no flowability.

Means for Solving the Problem

As a monomer having a unique structure containing a radical polymerizable (anionic polymerizable) (meth)acryloyl group and a cationic polymerizable vinyl ether group together in the molecule, hetero-polymerizable monomers are known such as 2-vinyloxyethyl acrylate (VEA), 2-vinyloxyethyl methacrylate (VEM), 2-(2-vinyloxyethoxy)ethyl acrylate (VEEA), 2-(2-vinyloxyethoxy)ethyl methacrylate (VEEM) and the like. These hetero-polymerizable monomers are capable of providing a unique polymer pendantly having a vinyl ether group by selection of the polymerization method thereof. If cationic polymerization thereof is carried out, a polymerization reaction of a vinyl ether group is selectively performed, and a (meth)acryloyl group pendant type polymer having a radical polymerizable (anionic polymerizable) double bond in a side chain is obtained as a heat, ultraviolet, or electron beam-curable polymer.

When the above-described side chain polymerizable group-containing polymer has a large molecular weight, particularly, a large number average molecular weight, a cured product obtained by curing a curable resin composition containing the side chain polymerizable group-containing polymer gets improved mechanical physical properties, therefore, a molecular design in accordance with its object is necessary.

In the above-described cationic polymerization, the molecular weight can be controlled by adjusting the reaction temperature or using an alcohol or the like as a chain transfer agent. However, high molecular weight materials having a molecular weight of several thousand or more are difficult to polymerize, and it is required, for example, to carry out polymerization at −10° C. or lower temperature or to use a special initiator, thus, large scale manufacturing is difficult.

The present inventors have intensively studied and resultantly found that by introducing a cyclic ether structure as a copolymerization component into a (meth)acryloyl group pendant type polymer having a radical polymerizable double bond in a side chain, a high molecular weight polymer can be obtained even at a relatively higher reaction temperature (for example, 40° C.), and by setting the weight ratio of copolymerization component in a specific range, a molecular design in accordance with its object is made possible, resolving the above-described problems at a time. Further, they have found that a curable resin composition containing the above-described polymer, which enables formation of a cured product having an excellent low warpage property, abrasion resistance and adhesion when, for example, applied on a base material made of a plastic and the like and cured to be laminated; the cured product; and an article obtained by laminating the cured product can be obtained, and completed the present invention.

That is, a polymer according to a first invention is obtained by polymerizing at least a vinyl monomer represented by the following general formula (1) and a cyclic ether compound represented by the following general formula (2).

(Chemical formula 1)

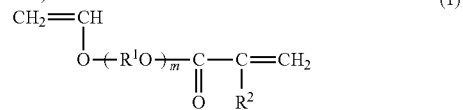
(1)

[wherein, $R^1$ represents an alkylene group having 2 to 8 carbon atoms, $R^2$ represents a hydrogen atom or a methyl group, and m represents a positive integer]

(Chemical formula 2)

(2)

[wherein, n represents an integer of 1 to 5]

A second invention is the polymer according to the first invention, obtained by polymerization of 1 wt % or more and 99.9 wt % or less of the above-described vinyl monomer represented by the general formula (1), 0.1 wt % or more and 99 wt % or less of the above-described cyclic ether compound represented by the general formula (2) and 0 wt % or more and 98.9 wt % or less of other cationic polymerizable monomers.

A third invention is the polymer according to the first or second invention, wherein the weight ratio of the above-described vinyl monomer represented by the general formula (1) to the above-described cyclic ether compound represented by the general formula (2) is in the range from 50/50 to 99.9/0.1.

A curable resin composition according to a fourth invention comprises the polymer as described in any one of the first to third inventions.

A cured product according to a fifth invention is obtained by curing the curable resin composition as described in the fourth invention.

An article according to a sixth invention is obtained by laminating the cured product as described in the fifth invention.

Effect of the Invention

According to the present invention, it has been made possible to make a molecular design suitable for the purpose, such as production of a high molecular weight polymer and the like, by a simple manner without using an active metal complex or reacting under low temperature, in producing a cationic polymer containing a radical polymerizable unsaturated group in a side chain.

Further, when the curable resin composition containing the polymer obtained by the present invention is coated and cured on a base material made of a plastic and the like or on a coated film on the base material, a cured product is obtained in which a formed coated film has high surface hardness and hardly suffers from scratch, and warping and curl of the laminated body and crack and peeling of the coated film scarcely occur, adhesion with the base material made of a plastic and the like or with the coated film is excellent, and light transmittance thereof is excellent; and an article obtained by laminating the cured product is obtained.

BEST MODES FOR CARRYING OUT THE INVENTION

The present invention will be specifically explained based on embodiments thereof below.

(1) Polymer (A)

The polymer (vinyl polymer) (A) of the present invention is obtained by polymerizing, at least, a vinyl monomer represented by the following general formula (1) and a cyclic ether compound represented by the following general formula (2).

(Chemical formula 3)

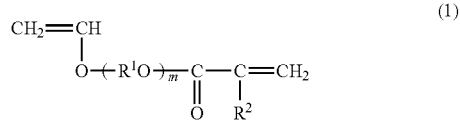
(1)

[wherein, $R^1$ represents an alkylene group having 2 to 8 carbon atoms, $R^2$ represents a hydrogen atom or a methyl group, and m represents a positive integer]

(Chemical formula 4)

(2)

[wherein, n represents an integer of 1 to 5]

(a) Vinyl Monomer Represented by the General Formula (1)

Examples of the alkylene group having 2 to 8 carbon atoms represented by $R^1$ in the above-described general formula (1) include ethylene group, trimethylene group, propylene group, tetramethylene group, pentamethylene group, hexamethylene group, heptamethylene group, octamethylene group, cyclohexylene group, 1,4-dimethylcyclohexane-α,α'-diyl group, 1,3-dimethylcyclohexane-α,α'-diyl group, 1,2-dimethylcyclohexane-α,α'-diyl group, 1,4-dimethylphenyl-α,α'-diyl group, 1,3-dimethylphenyl-α,α'-diyl group, 1,2-dimethylphenyl-α,α'-diyl group and the like. The number of the substituents represented by $R^1$ in the above-described general formula (1) is m, and the substituents may be the same or different.

In the above-described general formula (1), m represents a positive integer, preferably an integer of 1 to 20, more preferably an integer of 1 to 10, further preferably an integer of 1 to 5.

The polymer (A) of the present invention can be prepared by conventionally known cationic polymerization using, as a copolymerization component, a vinyl monomer which is a hetero-polymerizable monomer represented by the above-described general formula (1), or prepared also by living cationic polymerization according to a method described in JP-A No. 2006-241189. In this case, the vinyl monomers represented by the above-described general formula (1) may be used singly or in combination of two or more. In the latter case, the resultant copolymer may be any of a random copolymer, alternative copolymer, periodic copolymer, block copolymer or a combination thereof. It may also be a graft copolymer.

Specific examples of the vinyl monomer represented by the above-described general formula (1) include 2-vinyloxyethyl (meth)acrylate, 3-vinyloxypropyl (meth)acrylate, 2-vinyloxypropyl (meth)acrylate, 1-vinyloxypropyl (meth)acrylate, 1-methyl-2-vinyloxyethyl (meth)acrylate, 4-vinyloxybutyl (meth)acrylate, 3-vinyloxybutyl (meth)acrylate, 2-vinyloxybutyl (meth)acrylate, 1-methyl-3-vinyloxypropyl (meth)acrylate, 2-methyl-3-vinyloxypropyl (meth)acrylate, 1-methyl-2-vinyloxypropyl (meth)acrylate, 1,1-dimethyl-2-vinyloxyethyl (meth)acrylate, 6-vinyloxyhexyl (meth)acrylate, 4-vinyloxycyclohexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate, 4-vinyloxymethylphenylmethyl (meth)acrylate, 3-vinyloxymethylphenylmethyl (meth)acrylate, 2-vinyloxymethylphenylmethyl (meth)acrylate, 2-(2-vinyloxyethoxy)ethyl (meth)acrylate, 2-(2-vinyloxyisopropoxy)ethyl (meth)acrylate, 2-(2-vinyloxyethoxy)propyl (meth)acrylate, 2-(2-vinyloxyisopropoxy)propyl (meth)acrylate, 2-(2-vinyloxyethoxy)isopropyl (meth)acrylate, 2-(2-vinyloxyisopropoxy)isopropyl (meth)acrylate, 2-{2-(2-vinyloxyethoxy)ethoxy}ethyl (meth)acrylate, 2-{2-(2-vinyloxyisopropoxy)ethoxy}ethyl (meth)acrylate, 2-{2-(2-vinyloxyisopropoxy)isopropoxy}ethyl (meth)acrylate, 2-{2-(2-vinyloxyethoxy)ethoxy}propyl (meth)acrylate, 2-{2-(2-vinyloxyethoxy)isopropoxy}propyl (meth)acrylate, 2-{2-(2-vinyloxyisopropoxy)ethoxy}propyl (meth)acrylate, 2-{2-(2-vinyloxyisopropoxy)isopropoxy}propyl (meth)acrylate, 2-{2-(2-vinyloxyethoxy)ethoxy}isopropyl (meth)acrylate, 2-{2-(2-vinyloxyethoxy)isopropoxy}isopropyl (meth)acrylate, 2-{2-(2-vinyloxyisopropoxy)ethoxy}isopropyl (meth)acrylate, 2-{2-(2-vinyloxyisopropoxy)isopropoxy}isopropyl (meth)acrylate, 2-[2-{2-(2-vinyloxyethoxy)ethoxy}ethoxy]ethyl (meth)acrylate, 2-[2-{2-(2-vinyloxyisopropoxy)ethoxy}ethoxy]ethyl (meth)acrylate, 2-(2-[2-{2-(2-vinyloxyethoxy)ethoxy}ethoxy]ethoxy)ethyl (meth)acrylate; and the like.

Of these vinyl monomers, suitable are 2-vinyloxyethyl (meth)acrylate, 3-vinyloxyethyl (meth)acrylate, 2-vinyloxypropyl (meth)acrylate, 1-methyl-2-vinyloxyethyl (meth)acrylate, 4-vinyloxybutyl (meth)acrylate, 6-vinyloxyhexyl (meth)acrylate, 4-vinyloxycyclohexyl (meth)acrylate, 4-vinyloxymethylcyclohexylmethyl (meth)acrylate, 2-(2-vinyloxyethoxy)ethyl (meth)acrylate, 2-(2-vinyloxyisopropoxy)propyl (meth)acrylate, and 2-{2-(2-vinyloxyethoxy)ethoxy}ethyl (meth)acrylate.

The vinyl monomer represented by the above-described general formula (1) can be produced by using conventionally known methods. For example, when $R^1$ represents an ethylene group and m represents 1 in the above-described general formula (1), it can be produced by condensation of a metal salt of a (meth)acrylic acid with 2-halogenoethyl vinyl ether, transesterification of methyl (meth)acrylate and 2-hydroxyethyl vinyl ether, or condensation of a (meth)acrylic halide and 2-hydroxyethyl vinyl ether. When $R^1$ represents an ethylene group and m represents 2 in the above-described general formula (1), it can be produced by condensation of a metal salt of (meth)acrylic acid and 2-(2-halogenoethoxy)ethyl vinyl ether, transesterification of methyl (meth)acrylate and 2-(2-hydroxyethoxy)ethyl vinyl ether, or condensation of a (meth)acrylic halide and 2-(2-hydroxyethoxy)ethyl vinyl ether.

(b) Cyclic Ether Compound Represented by the General Formula (2)

In the above-described general formula (2), n represents an integer of 1 to 5, preferably an integer of 1 to 3, more preferably 1.

Specific examples of the cyclic ether compound represented by the general formula (2) (oxygen-containing monocyclic monomer) include 2,3-dihydrofuran, 2,3-dihydropyran and the like. Of them, 2,3-dihydrofuran is preferable.

(c) Other Cationic Polymerizable Monomer

The polymer (A) of the present invention is obtained by polymerizing, if necessary, the following cationic polymerizable monomer as a copolymerization component, in addition to the vinyl monomer represented by the above-described general formula (1) and the cyclic ether compound represented by the above-described general formula (2).

Examples of the above-described cationic polymerizable monomer include vinyl ether compounds such as ethyl vinyl ether, n-propyl vinyl ether, isopropyl vinyl ether, n-butyl vinyl ether, isobutyl vinyl ether, t-butyl vinyl ether, 2-ethylhexyl vinyl ether, 2-chloroethyl vinyl ether, 4-hydroxybutyl vinyl ether, cyclohexyl vinyl ether and the like; styrene derivatives such as styrene, 4-methylstyrene, 3-methylstyrene, 2-methylstyrene, 2,5-dimethylstyrene, 2,4-dimethylstyrene, 2,4,6-trimethylstyrene, 4-t-butylstyrene, 2-chlorostyrene, 3-chlorostyrene, 4-chlorostyrene, 4-methoxystyrene, 4-chloromethylstyrene and the like; N-vinyl compounds such as N-vinylcarbazole, N-vinylpyrrolidone and the like; divinyl compounds and trivinyl compounds such as isopropenylstyrene, 2-vinyloxyethyl cinnamate, 2-vinyloxyethyl sorbate and the like; etc. These cationic polymerizable monomers may be used singly or in combination of two or more.

Of these cationic polymerizable monomers, vinyl ether compounds such as isobutyl vinyl ether, cyclohexyl vinyl ether and the like are suitable.

When the polymer (A) of the present invention is a copolymer obtained by polymerization of the above-described cationic polymerizable monomer, such a copolymer can be easily prepared by cationic polymerization of a vinyl monomer represented by the above-described general formula (1), a cyclic ether compound represented by the above-described general formula (2), and the above-described caitonic polymerizable monomer.

(d) Polymer (A)

The polymer (A) of the present invention is obtained by polymerizing, at least, a vinyl monomer represented by the above-described general formula (1) and a cyclic ether compound represented by the above-described general formula (2).

The polymer (A) of the present invention is preferably obtained by polymerization of 1 wt % or more and 99.9 wt % or less of a vinyl monomer represented by the above-described general formula (1), 0.1 wt % or more and 99 wt % or less of a cyclic ether compound represented by the above-described general formula (2) and 0 wt % or more and 98.9 wt % or less of the other cationic polymerizable monomer.

Regarding the amount of the vinyl monomer represented by the above-described general formula (1), the upper limit is preferably 99 wt %, more preferably 98 wt % and the lower limit is preferably 5 wt %, more preferably 10 wt %, further preferably 15 wt %.

Regarding the amount of the cyclic ether compound represented by the above-described general formula (2), the upper limit is preferably 98 wt %, more preferably 50 wt %, further preferably 47 wt % and the lower limit is preferably 0.5 wt %, more preferably 1 wt %.

Regarding the amount of the other cationic polymerizable monomer, the upper limit is preferably 90 wt %, more preferably 80 wt %, further preferably 70 wt %, particularly preferably 60 wt % and the lower limit is preferably 5 wt %, more preferably 10 wt %, further preferably 15 wt %.

In the polymer (A) of the present invention, regarding the weight ratio of the vinyl monomer represented by the above-described general formula (1) to the cyclic ether compound represented by the above-described general formula (2), the upper limit is 99.9/0.1, preferably 99.5/0.5, more preferably 99/1, further preferably 98/2 and the lower limit is 50/50, preferably 51/49, more preferably 52/48, further preferably 53/47.

If the content of lower molecular weight components increases in the polymer (A) of the present invention, when the polymer (A) is blended into a curable resin composition and a cured film is formed, the strength of the cured film lowers in some cases.

Regarding the number average molecular weight (Mn) of the polymer (A) of the present invention, the upper limit is preferably 500,000, more preferably 100,000, further preferably 50,000 and the lower limit is preferably 4,000, more preferably 5,000, further preferably 5,500, particularly preferably 6,000.

When the number average molecular weight (Mn) of the polymer (A) is less than 4000, lowering of curing speed, lowering of the strength of a cured product and lowering of folding resistance occur in some cases. When the number average molecular weight (Mn) is over 500,000, wettability with a base material lowers, mixing time in preparing a curable resin composition is elongated, viscosity increases, and for example, handling properties such as coatability and the like lower, in some cases.

Though a detailed mechanism thereof is unclear, by introducing a cyclic ether skeleton derived from a cyclic ether compound represented by the above-described general formula (2) into the polymer (A) of the present invention, an active cationic species during polymerization is stabilized, and a higher molecular weight can be obtained even if the reaction is carried out at a relatively higher temperature (for example, 40° C.).

Here, the number average molecular weight (Mn) is measured by a gel permeation chromatography (GPC) apparatus HLC-8220GPC manufactured by Tosoh Corporation, using two columns of TSK-gel SuperHM-H and one column of TSK-gel SuperH2000 manufactured by Tosoh Corporation, under conditions of a temperature of 40° C. and a flow rate of 0.3 mL/min, using tetrahydrofuran (THF) as eluent, and reduced by polystyrene standards.

The polymer (A) of the present invention can be obtained as viscous liquid, excluding the case of a so large content of monomers as to give solid polymer (A). In the case of viscous liquid, solubility thereof with organic solvents and (meth) acrylate monomers is excellent, thus, it is possible to improve working efficiency in preparing a curable resin composition. When viscosity is lower, workability is good, and wettability with a base material is improved in fabricating a laminated body.

The method of producing the polymer (A) of the present invention will be explained in detail below.

As the production conditions for the polymer (A) of the present invention, various reaction conditions such as the polymerization catalyst, co-catalyst, polymerization solvent, polymerization temperature, polymerization concentration and the like can be appropriately selected, and as the polymerization catalyst, conventionally known polymerization catalysts which can be adopted in cationic polymerization can be used.

Examples of the polymerization catalyst include, specifically, Broensted acids such as hydrofluoric acid, hydrochloric acid, hydrobromic acid, hydroiodic acid, nitric acid, sulfuric acid, trichloroacetic acid, trifluoroacetic acid and the like; Lewis acids such as boron trifluoride and complexes thereof, aluminum trichloride, aluminum tribromide, tin tetrachloride, zinc dichloride, ferric chloride and the like; organometal compounds such as diethylaluminum chloride, ethylaluminum chloride, diethylzinc and the like; heteropoly acids such as phosphotungstic acid, phosphomolybdic acid, phosphomolybdotungstic acid, phosphomolybdovanadic acid, phosphomolybdotungstovanadic acid, phosphotungstovanadic acid, phosphomolybdoniobic acid, silicotungstic acid, silicomolybdic acid, silicomolybdotungstic acid, silicomolybdotungstovanadic acid, germaniumtungstic acid, borotungstic acid, boromolybdic acid, boromolybdotungstic acid, boromolybdovanadic acid, boromolybdotungstovanadic acid, and partially neutralized metal salts of the above-described phosphotungstic acid and the like; and salts thereof, complexes thereof, and the like.

The co-catalyst includes, specifically, water; hydroxyl group-containing compounds such as methanol, ethanol, phenol and the like, etc.

Of them, Lewis acids and heteropoly acids are preferable, and heteropoly acids are more preferable. Further, as heteropoly acids, preferable are oxyacids or salts thereof generated by condensation of an oxide of at least one element from Mo, W and V with an oxyacid of other element (for example, P, Si, As, Ge, B, Ti, Ce and the like), and the ratio of the former atom to the latter atom is preferably 2.5 to 12, and 12 is suitable. When the above-described co-catalyst is used together with this polymerization catalyst, the reaction is promoted in some cases.

The addition amount of the polymerization catalyst to be used in the present invention is not especially limited, and for example, since a heteropolyacid has high activity, the polymerization reaction thereof progresses sufficiently even if the use amount thereof with respect to a vinyl ether is 100 ppm or less, if necessary, the addition amount of the polymerization catalyst may be increased. Usually, regarding the use amount of the polymerization catalyst with respect to the total amount of cationic polymerizable monomers, the upper limit is 3 wt %, preferably 5000 ppm and the lower limit is 1 ppm, preferably 10 ppm. For obtaining the polymer (A) having higher molecular weight, the upper limit is further preferably 100 ppm and the lower limit is further preferably 10 ppm.

As the polymerization solvent, aprotic solvents are preferable. Specifically, aromatic hydrocarbons such as toluene, xylene, benzene and the like; ketones such as acetone, methyl ethyl ketone, methyl isobutyl ketone and the like; aliphatic hydrocarbons such as hexane, octane and the like; saturated cyclic hydrocarbons such as cyclohexane, methylcyclohexane and the like; halogenated hydrocarbons such as chloroform, trichloroethylene and the like; esters such as ethyl acetate, butyl acetate, butyl propionate and the like; ethers such as propylene glycol methyl ether acetate, diethylene glycol dimethyl ether, diethylene glycol ethyl methyl ether and the like; cyclic ethers such as tetrahydrofuran, 1,4-dioxane and the like; nitriles such as acetonitrile, benzonitrile and the like; etc. can be used. For obtaining the polymer (A) having higher molecular weight, it is preferable to used non-polar solvents such as aromatic hydrocarbons, aliphatic hydrocarbons, saturated cyclic hydrocarbons, esters and the like.

For obtaining the polymer (A) having higher molecular weight, it is very important to control the amount of a protic compound such as water, alcohol and the like in the reaction system. The amount of the protic compound such as water, alcohol and the like in the reaction system is preferably 3000 ppm or less, more preferably 2000 ppm or less. Further preferably, it is 1000 ppm or less. When the amount of the protic compound in the reaction system is over 3000 ppm, the polymer (A) having higher molecular weight is not obtained. Depending on the case, monomer doesn't react in the appearance, and polymer is not obtained.

In the present invention, the temperature for polymerizing the above-described cationic polymerizable monomer is not particularly restricted, however, it is preferably −10 to 100° C. Particularly, for obtaining the polymer (A) having higher molecular weight, it is preferable to adjust the polymerization temperature to 10 to 60° C. by heating or cooling. Since the molecular weight distribution of the resultant polymer (A) is narrow by carrying out the polymerization so that the temperature of the reaction solution in the reaction vessel is approximately constant during the polymerization, it is preferable to control the polymerization temperature as much as possible. When the polymerization temperature is less than −10° C., industrial temperature control becomes very difficult in some cases, or solidification and viscosity increase occur, leading to difficult handling, in some cases. When the polymerization temperature is over 100° C., the molecular weight of the resultant polymer (A) lowers in some cases.

The reaction pressure may be reduced pressure, normal pressure or increased pressure, and the reaction is usually effected at normal pressure.

In the present invention, monomers can polymerize by any process, for example by batch, semi-batch or continuous method. In the batch-process reaction, monomers and a catalyst may be put into a reaction apparatus at a time, or a part thereof or all of them may be put in by dividing, or by dropping and the like. Particularly, it is preferable that a part of monomers or all of them are dropped and the polymerization reaction is carried out. Also for the polymerization catalyst, it is preferably dropped. By carrying out the polymerization reaction while dropping monomers and a polymerization catalyst, heat generation in the initial period of the reaction is suppressed and the reaction temperature can be kept constant, further, a new effect of suppression of production of lower molecular weight polymers, leading to production of a polymer (A) having narrow molecular weight distribution, is obtained.

After the polymerization reaction, the reaction may be quenched by adding a protic compound such as water, alcohol and the like; an organic base such as ammonia, amine and the like; or an inorganic base such as NaOH, KOH and the like.

In the present invention, since it is necessary to carry out cationic polymerization under condition of an unreaction of a (meth)acrylate group, it is preferable to carry out the polymerization while blowing, preferably a nitrogen/air mixed gas, particularly preferably a nitrogen/oxygen mixed gas having an oxygen concentration controlled to 3 to 10 vol %, into a gas phase part or a liquid phase part. Use of a radical polymerization inhibitor and polymerization in a reaction vessel having a light shielding property are also effective.

As the radical polymerization inhibitor, conventionally known compounds can be appropriately selected. Preferable are hindered phenol type inhibitors, and more preferable are compounds having a structure in which a phenyl group having at least a phenolic hydroxyl group is present and a hydrogen atom bonds to one of carbon atoms adjacent to a carbon atom to which the above-described phenolic hydroxyl group is connected, and an alkyl group bonds to another carbon atom.

As specific examples of the radical polymerization inhibitor, compounds as described below and the like are suitable. These can be used singly or in combination of two or more.

2-t-butylhydroquinone, 2-t-amylhydroquinone, 2,5-di-t-butylhydroquinone, 2,5-di-t-amylhydroquinone, tris(3-t-butyl-4-hydroxybenzyl) isocyanate, tris(3-t-amyl-4-hydroxybenzyl) isocyanate, 1,1,3-tris(2-methyl-4-hydroxy-5-t-butylphenyl)butane, 1,1,3-tris(2-ethyl-4-hydroxy-5-t-amylphenyl)butane, 4,4-butylidenebis(3-methyl-6-t-butylphenol), 4,4-butylidenebis(3-methyl-6-t-amylphenol), tetrakis[methylene-3-(3-t-butyl-4-hydroxyphenyl) propionate]methane, triethylene glycolbis[3-(3-t-butyl-4-hydroxyphenyl)propionate], 3,9-bis[1,1-dimethyl-2-{β-(3-t-butyl-4-hydroxyphenyl)propinonyloxy}ethyl]-2,4,8,10-tetraoxaspiro[5,5]undecane, 1,3,5-trimethyl-2,4,6-tris(3-t-butyl-4-hydroxybenzyl)benzene, N,N'-bis[3-(3-t-butyl-4-hydroxyphenyl)propionyl]hexamethylenedi-amine, 3-t-butyl-4-hydroxybenzyl phosphate diethyl ester, di(2-t-butyl-4-hydroxyphenyl)pentaerythritol diphosphite, tris(2-t-butyl-4-hydroxyphenyl) phosphite, 2,2'-oxamide bis[ethyl-3-(3-t-butyl-4-hydroxyphenyl)propionate] and the like can be preferably used.

More preferable are 2,5-di-t-butylhydroquinone, 2,5-di-t-amylhydroquinone, tris(3-t-butyl-4-hydroxybenzyl) isocyanate, tris(3-t-amyl-4-hydroxybenzyl) isocyanate, 1,1,3-tris (2-methyl-4-hydroxy-5-t-butylphenyl)butane, 1,1,3-tris(2- ethyl-4-hydroxy-5-t-amylphenyl)butane, 4,4-butylidene-bis (3-methyl-6-t-butylphenol), 4,4-butylidene-bis(3-methyl-6-t-amylphenol), 1,3,5-trimethyl-2,4,6-tris(3-t-butyl-4-hydroxybenzyl)benzene and the like.

Regarding the use amount of the above-described radical polymerization inhibitor with respect to solid content of the polymer, the lower limit is preferably 1 ppm by weight. When less than 1 ppm by weight, there is a possibility that the polymerization inhibiting performance cannot be improved sufficiently. More preferably, it is 5 ppm by weight, further preferably 10 ppm by weight, further preferably 20 ppm by weight, particularly preferably 50 ppm by weight, most preferably 100 ppm by weight. The upper limit is preferably 10,000 ppm by weight. When the upper limit is over 10,000 ppm by weight, there is a possibility of lowering of curability. More preferably, it is 8,000 ppm by weight, further preferably 6,000 ppm by weight, particularly preferably 4,000 ppm by weight.

For the polymer (A) resulted in the present invention, it is preferable that a gas phase part is maintained with preferably a nitrogen/air mixed gas, particularly preferably a nitrogen/oxygen mixed gas having an oxygen concentration controlled to 3 to 10 vol %. Further, preservation at a low temperature of 30° C. or less, transportation and preservation in a light shielding vessel are also effective. Use of the above-described radical polymerization inhibitor is also effective.

Since the vinyl monomer represented by the above-described general formula (1) has a radical or anionic polymerizable (meth)acryloyl group and a cationic polymerizable vinyl ether group simultaneously, a polymer (A) having a (meth)acryloyl group or vinyl ether group as a pendant group is obtained by selecting the polymerization reaction.

In the present invention, a polymer (A) having a (meth)acryloyl group as a pendant group is obtained by cation-polymerizing a vinyl ether group of a vinyl monomer represented by the above-described general formula (1) and a cyclic ether compound represented by the above-described general formula (2), if necessary, together with the other cationic polymerizable monomer described above.

(2) Curable Resin Composition

The curable resin composition of the present invention contains the polymer (A) of the present invention as an essential component. In addition to the polymer (A), a co-curable compound (B) such as, for example, a polymerizable monomer, an oligomer, or other polymer having a polymerizable group, or the like, is preferably contained. The co-curable compound (B) may be a compound containing at least one functional group having a polymerizable group in the molecule, and the compounds (B) may be used singly or in combination of two or more.

Other components may be further contained providing that the action and the effect of the present invention are not deteriorated.

The curable resin composition of the present invention preferably contains a polymerization initiator, in addition to the polymer (A) of the present invention and the co-curable compound (B). When a polymerization initiator is contained, an effect that the curable resin composition can be cured by heat or a light such as ultraviolet, visible light and the like is performed.

In the curable resin composition, the total content of the polymer (A) and the co-curable compound (B) is 80 wt % or more, preferably 85 wt %, more preferably 90 wt % or more. When the total content is less than 80 wt %, there is a possibility that the sufficient hardness of the cured product is not obtained and abrasion resistance thereof lowers.

In the curable resin composition of the present invention, regarding the blending amount of the polymer (A) of the present invention with respect to the total amount of the curable resin composition, the upper limit is 100 wt % and the lower limit is 10 wt %, preferably 20 wt %, more preferably 40 wt %. When the blending amount of the polymer (A) is less than 10 wt %, cross-linked density lowers, resulting in decrease in curing speed and insufficient film hardness of a cured product, in some cases.

Specific examples of the above-described polymer of the co-curable compound (B) include acrylic resin, urethane acrylate resin, epoxy acrylate resin, polyester resin, polyurethane resin, polystyrene resin, silicon resin, rubber resin and the like.

The above-described polymerizable monomer of the co-curable compound (B) is not particularly restricted providing it is co-curable with the polymer (A), and specific examples thereof include styrene monomers such as styrene, vinyltoluene, 4-t-butylstyrene, α-methylstyrene, 4-chlorostyrene, 4-methylstyrene, 4-chloromethylstyrene, divinylbenzene and the like; allyl ester monomers such as diallyl phthalate, diallyl isophthalate, triallyl cyanurate, triallyl isocyanurate and the like; (meth)acrylic acid derivatives such as monofunctional (meth)acrylate compounds such as methyl (meth)acrylate, ethyl (meth)acrylate, propyl (meth)acrylate, butyl (meth)acrylate, 2-ethylhexyl (meth)acrylate, cyclohexyl (meth)acrylate, isobornyl (meth)acrylate, 1-adamantyl (meth)acrylate, tetrahydrofurfuryl (meth)acrylate, 2-hydroxyethyl (meth)acrylate, 2-hydroxypropyl (meth)acrylate, glycidiyl (meth)acrylate, polyethylene glycol mono(meth)acrylate, polypropylene glycol mono(meth)acrylate, methoxydiethylene glycol (meth)acrylate, butoxydiethylene glycol (meth)acrylate, phenoxyethyl (meth)acrylate, trifluoroethyl (meth)acrylate, perfluorooctylethyl (meth)acrylate and the like; bifunctional (meth)acrylate compounds such as ethylene glycol di(meth)acrylate, diethylene glycol di(meth)acrylate, 1,6-hexanediol di(meth)acrylate, 1,9-nonanediol di(meth)acrylate, neopentyl glycol di(meth)acrylate, 3-methyl-1,5-pentanediol di(meth)acrylate, 2-butyl-2-ethyl-1,3-propanediol di(meth)acrylate, dimethyloltricyclodecane di(meth)acrylate, pentacyclopentadecane dimethanol di(meth)acrylate, di(meth)acrylic acid adduct of bisphenol A diglycidyl ether, cyclohexanedimethanol di(meth)acrylate, norbornanedimethanol di(meth)acrylate, p-mentane-1,8-diol di(meth)acrylate, p-mentane-2,8-diol di(meth)acrylate, p-mentane-3,8-diol di(meth)acrylate, bicyclo[2.2.2]-octane-1-methyl-4-isopropyl-5,6-dimethylol di(meth)acrylate and the like; tri- or more-functional (meth)acrylate compounds such as trimethylolpropane tri(meth)acrylate, trimethylolethane tri(meth)acrylate, glycerin tri(meth)acrylate, pentaerythritol tetra(meth)acrylate, dipentaerythritol hexa(meth)acrylate and the like; vinyl ether monomers such as triethylene glycoldivinyl ether, cyclohexanedimethanol divinyl ether, hydroxybutyl vinyl ether, dodecyl vinyl ether and the like; allyl ether monomers such as trimethylolpropane diallyl ether, pentaerythritol triallyl ether, allyl glycidyl ether, allyl ether of methylolmelamine, adipate ester of glycerin diallyl ether, allyl acetal, allyl ether of methylol glyoxal uleine, and the like; maleate ester monomers such as diethyl maleate, dibutyl maleate and the like; fumarate ester monomers such as dibutyl fumarate, dioctyl fumarate and the like; 1,3-dioxolane monomers such as 4-(meth)acryloyloxymethyl-2-methyl-2-ethyl-1,3-dioxolane, 4-(meth)acryloyloxymethyl-2-methyl-2-isobutyl-1,3-dioxolane, 4-(meth)acryloyloxymethyl-2-cyclohexyl-1,3-dioxolane, 4-(meth)acryloyloxymethyl-2,2-dimethyl-1,3-dioxolane, and the like; (meth)acryloylmorpholine;

N-vinylformamide; N-vinylpyrrolidone; and the like. These polymerizable monomers may be used singly or in combination of two or more. Of these polymerizable monomers, (meth)acrylic ester compounds are suitable, further, (meth) acrylic ester compounds having an alicyclic structured substituent are suitable.

The blending amount of the above-described polymerizable monomer is preferably 0 to 70 wt %, more preferably 0 to 40 wt % with respect to the total amount of the curable resin composition. When the blending amount of the polymerizable monomer is over 70 wt %, curing shrinkage increases and internal strain and the warpage of a cured product increase, in some cases.

Since the polymerizable monomer represented by the above-described general formula (1) has a radical polymerizable (meth)acryloyl group, examples of the polymerization initiator include thermal polymerization initiators which generate a polymerization initiation radical by heating; photopolymerization initiators which generate a polymerization initiation radical by irradiation with ultraviolet ray or visible ray; and the like. These polymerization initiators may be used singly or in combination of two or more. It is also preferable to further add a thermal polymerization accelerator, photosensitizing agent, photopolymerization accelerator and the like.

Examples of the thermal polymerization initiator include organic peroxide initiators such as methyl ethyl ketone peroxide, cyclohexanone peroxide, 1,1-bis(t-butylperoxy)-3,3,5-trimethylcyclohexane, cumene hydroperoxide, benzoyl peroxide, bis(4-t-butylcyclohexyl)peroxy dicarbonate, cumylperoxy neodecanoate, 1,1,3,3-tetramethylbutylperoxy neodecanoate, 2,5-dimethyl-2,5-bis(2-ethylhexanoylperoxy) hexanoate, t-butylperoxy-2-ethyl hexanoate, t-butyl peroxybenzoate and the like; azo initiators such as 2,2'-azobisisobutyronitrile, 2,2'-azobis(2,4-dimethyl-valeronitrile), 2,2'-azobis(2,4-dimethyl-4-methoxyvaleronitrile), 2,2'-azobis(2-methylpropionamidine) dihydrochloride, 2,2'-azobis(2-methyl-N-phenylpropionamidine) dihydrochloride, 2,2'-azobis[N-(4-chlorophenyl)-2-methylpropionamidine)] dihydrochloride, 2,2'-azobis[N-(4-hydrophenyl)-2-methylpropionamidine)]dihydrochloride, 4,4'-azobis(4-cyanopentanoic acid) and the like; etc. These thermal polymerization initiators may be used singly or in combination of two or more.

Among these thermal polymerization initiators, compounds such as methyl ethyl ketone peroxide, cyclohexanone peroxide, cumene hydroperoxide, t-butyl peroxybenzoate, benzoyl peroxide and the like, which are capable of efficiently generating radicals by catalysis by metal soaps and/or amine compounds, etc., and 2,2'-azobisisobutyronitrile, 2,2'-azobis (2,4-dimethyl-valeronitrile) are suitable.

Examples of the photopolymerization initiator include acetophenones such as diethoxyacetophenone, 2-hydroxy-2-methyl-1-phenylpropan-1-one, benzyldimethylketal, 4-(2-hydroxyethoxy)phenyl-(2-hydroxy-2-propyl) ketone, 1-hydroxycyclohexylphenyl ketone, 2-methyl-1-[4-(methylthio) phenyl]-2-morpholinopropan-1-one, 2-benzyl-2-dimethylamino-1-(4-morpholinophenyl)butanone, 2-hydroxy-2-methyl-1-[4-(1-methylvinyl)phenyl]propanone oligomer and the like; benzoins such as benzoin, benzoin methyl ether, benzoin ethyl ether, benzoin isopropyl ether, benzoin isobutyl ether and the like; benzophenones such as benzophenone, methyl o-benzoylbenzoate, 4-phenylbenzophenone, 4-benzoyl-4'-methyldiphenyl sulfide, 3,3',4,4'-tetra(t-butylperoxycarbonyl)benzophenone, 2,4,6-trimethylbenzophenone, 4-benzoy-1N,N-dimethyl-N-[2-(1-oxy-2-propenyloxy)ethyl]benzene-methanaminium bromide, (4-benzoylbenzyl)trimethylammonium chloride and the like; thioxanetones such as 2-isopropylthioxanetone, 4-isopropylthioxanetone, 2,4-diethylthioxanetone, 2,4-dichlorothioxanetone, 1-chloro-4-propoxythioxanetone, 2-(3-dimethylamino-2-hydroxy)-3,4-dimethyl-9H-thioxaneton-9-one-mesochloride and the like; etc. These photopolymerization initiators may be used singly or in combination of two or more.

Among these photopolymerization initiators, acetophenones, benzophenones and acylphosphine oxides are suitable, and 2-hydroxy-2-methyl-1-phenylpropan-1-one and 2-methyl-2-morpholino(4-thiomethylphenyl)propan-1-one are particularly suitable.

The blending amount of the above-described polymerization initiator is preferably 0.05 to 20 wt %, more preferably 0.1 to 15 wt %, and further preferably 0.2 to 10 wt %, with respect to the total amount of the curable resin composition. When the blending amount of the polymerization initiator is less than 0.05 wt %, the composition is not cured sufficiently, in some cases. In contrast, when the blending amount of the polymerization initiator is over 20 wt %, the property of the cured product is not further improved, and conversely, a bad influence is exerted and economic efficiency is deteriorated.

In the case of use of a thermal polymerization initiator as the polymerization initiator, a thermal polymerization accelerator which accelerates the decomposition of the thermal polymerization initiator to cause effective generation of radicals can be used to lower the decomposition temperature of the thermal polymerization initiator. Examples of the thermal polymerization accelerator include soaps of metals such as cobalt, copper, tin, zinc, manganese, iron, zirconium, chromium, vanadium, calcium, potassium and the like; primary, secondary and tertiary amine compounds, quaternary ammonium salts, thiourea compounds, ketone compounds and the like. These thermal polymerization accelerators may be used singly or in combination of two or more. Among these thermal polymerization accelerators, suitable are cobalt octylate, cobalt naphthenate, copper octylate, copper naphthenate, manganese octylate, manganese naphthenate, dimethylaniline, triethanolamine, triethylbenzylammonium chloride, di(2-hydroxyethyl)p-toluidine, ethylenethiourea, acetylacetone and methyl acetoacetate.

The blending amount of the thermal polymerization accelerator is in the range of preferably 0.001 to 20 wt %, more preferably 0.01 to 10 wt % or more, further preferably 0.05 to 5 wt % with respect to the total amount of the curable resin composition. When the blending amount of the thermal polymerization accelerator is in such a range, curability of the composition, physical properties of the cured product and economical efficiency are preferable.

In the case of use of a photopolymerization initiator as the polymerization initiator, a photosensitizing agent which transfers excitation energy from the excited state generated by photoexcitation to the photopolymerization initiator and accelerates the decomposition of the photopolymerization initiator to cause effective generation of radicals can be used. Examples of the photosensitizing agent include 2-chlorothioxanetone, 2,4-diethylthioxanetone, 2,4-diisopropylthioxanetone and the like. These photosensitizing agents may be used singly or in combination of two or more.

The blending amount of the photosensitizing agent is in the range of preferably 0.05 to 20 wt %, more preferably 0.1 to 15 wt %, and further preferably 0.2 to 10 wt % with respect to the total amount of the curable resin composition. When the blending amount of the photosensitizing agent is in such a range, curability of the composition, physical properties of the cured product and economical efficiency are preferable.

In the case of use of a photopolymerization initiator as the polymerization initiator, a photopolymerization accelerator which accelerates the decomposition of the photopolymerization initiator to cause effective generation of radicals can be used. Examples of the photopolymerization accelerator include triethanolamine, methyldiethanolamine, triisopropanolamine, methyl 4-dimethylaminobenzoate, ethyl 4-dimethyl-aminobenzoate, isoamyl 4-dimethylaminobenzoate, 2-n-butoxyethyl 4-dimethylaminobenzoate, 2-dimethylaminoethyl benzoate, N,N-dimethylparatoluidine, 4,4'-dimethylaminobenzophenone, 4,4'-diethylaminobenzophenone and the like. These photopolymerization accelerators may be used singly or in combination of two or more. Among these photopolymerization accelerators, suitable are triethanolamine, methyldiethanolamine and triisopropanolamine.

The content of the photopolymerization accelerator is in the range of preferably 0.05 to 20 wt %, more preferably 0.1 to 15 wt %, and further preferably 0.2 to 10 wt % with respect to the total amount of the curable resin composition. When the blending amount of the photopolymerization accelerator is in such a range, curability of the composition, physical properties of the cured product and economical efficiency are preferable.

In the case of blending of the thermal polymerization initiator, photopolymerization initiator, thermal polymerization accelerator, photosensitizing agent, photopolymerization accelerator and the like in combination, the total amount of the blending amounts thereof is in the range of preferably 0.05 to 20 wt %, more preferably 0.1 to 15 wt %, further preferably 0.2 to 10 wt % with respect to the total amount of the composition. When the total amount of the combined blending amounts of the thermal polymerization initiator and the like is in such a range, curability of the composition, physical properties of the cured product and economical efficiency are preferable.

It is preferable that the curable resin composition of the present invention contains no solvent other than polymerizable monomers, however, if necessary, a solvent may be added. As the solvent, for example, aromatic hydrocarbons such as benzene, toluene, chlorobenzene and the like; aliphatic or alicyclic hydrocarbons such as pentane, hexane, cyclohexane, heptane and the like; halogenated hydrocarbons such as carbon tetrachloride, chloroform, ethylene dichloride and the like; nitro compounds such as nitromethane, nitrobenzene and the like; ethers such as diethyl ether, methyl t-butyl ether, tetrahydrofuran, 1,4-dioxane and the like; esters such as methyl acetate, ethyl acetate, isopropyl acetate, amyl acetate and the like; dimethylformamide; alcohols such as methanol, ethanol, propanol and the like; ketones such as acetone, methyl ethyl ketone, cyclohexanone and the like; etc. can be used.

The curable resin composition of the present invention may contain fine particles made of a metal oxide, in addition to the polymer (A) of the present invention. When fine particles made of a metal oxide are contained, an effect of improving the hardness of the coated film after curing to cause a scarce tendency of scratch is performed.

It is more preferable that the metal oxide constituting fine particles contains at least one metal element selected from the group consisting of Si, Ti, Zr, Zn, Sn, In, La and Y. The metal oxide constituting fine particles may be a single oxide containing these elements, or a composite oxide containing these elements. Specific examples of the metal oxide constituting fine particles include SiO, $SiO_2$, $TiO_2$, $ZrO_2$, ZnO, $SnO_2$, $In_2O_3$, $La_2O_3$, $Y_2O_3$, $SiO_2$—$Al_2O_3$, $SiO_2$—$Zr_2O_3$, $SiO_2$—$Ti_2O_3$, $Al_2O_3$—$ZrO_2$, $TiO_2$—$ZrO_2$ and the like. The fine particles made of these metal oxides may be used singly or in combination of two or more. Among the fine particles made of these metal oxides, suitable are $SiO_2$, $TiO_2$, $ZrO_2$ and $ZnO_2$.

The average particle size of fine particles made of metal oxides is preferably 1 to 100 nm, more preferably 1 to 20 nm. When the average particle size of fine particles is over 100 nm, the transparency of the cured product is deteriorated. The average particle size of fine particles means a volume-average particle size obtained by measuring using a dynamic light scattering mode particle size distribution measuring apparatus.

The blending amount of fine particles made of metal oxides is preferably 0 to 5 wt %, more preferably 1 to 3 wt % with respect to the total amount of the curable resin composition.

To the curable resin composition of the present invention, further, if necessary, non-reactive resins (for example, acrylic resin, urethane acrylate resin, polyester resin, polyurethane resin, polystyrene resin, polyvinyl chloride resin and the like), coloring pigments, plasticizers, polymerization inhibitors, photo-stabilizers, antioxidants, flame retardants, frosting agents, dyes, defoaming agents, leveling agents, antistatic agents, dispersing agents, slipping agents, surface modifiers, thixotropic agents, thixotropic auxiliary agents and the like can be added, as additives. The presence of these additives does not particularly exert an influence on the effect of the present invention. These additives may be used singly or in combination of two or more.

The blending amount of the above-described additive may be appropriately set depending on the kind of the additive and use object thereof, the application of the composition and use method thereof, and the like, and is not particularly restricted. Examples thereof include non-reactive resins, coloring pigments, plasticizers, polymerization inhibitors, ultraviolet absorbers, antioxidants, frosting agents, dyes, defoaming agents, leveling agents, antistatic agents, dispersing agents, slipping agents, surface modifiers, water repellent agents, oil repellent agents, thixotropic agents, thixotropic auxiliary agents and the like. The blending amount thereof is in the range of preferably 0 to 10 wt %, more preferably 0.2 to 5 wt % with respect to the total amount of the curable resin composition.

(3) Production of Curable Resin Composition, Cured Product, and Laminated Body (Article)

The curable resin composition of the present invention can be obtained by blending the polymer (A) of the present invention, the co-curable compound (B), various additives such as a polymerization initiator, thermal polymerization accelerator, photosensitizing agent, photopolymerization accelerator, solvent and metal oxide fine particles and the like, mixing and stirring them.

The curable resin composition of the present invention can be cured by irradiation with an electron beam when a polymerization initiator is not blended, by heating when a thermal polymerization initiator is blended, and, by irradiation with ultraviolet ray or visible ray when a photopolymerization initiator is blended.

The cured product of the present invention is obtained by curing the curable resin composition or a material containing the composition.

For example, in the case of curing by heating, infrared ray, far infrared ray, hot air, high frequency heating and the like may be used. The heating temperature may be appropriately adjusted depending on the kind of a base material and the like and is not particularly restricted, and it is in the range of preferably 80 to 200° C., more preferably 90 to 180° C., further preferably 100 to 170° C. The heating time may be appropriately adjusted depending on the application area and the like and is not particularly restricted, and it is in the range of preferably 1 minute to 24 hours, more preferably 10 minutes to 12 hours, further preferably 30 minutes to 6 hours.

In the case of curing, for example, by ultraviolet ray or visible ray, a light source containing light having a wavelength of 150 to 450 nm may be used. Examples of such a light source include a solar beam, low pressure mercury lamp, high pressure mercury lamp, extra high pressure mercury lamp, metal halide lamp, gallium lamp, xenon lamp, xenon flash lamp, carbon arc lamp and the like. Together with these light sources, heat by infrared ray, far infrared ray, hot air, high frequency heating and the like can also be used together. The irradiated accumulated light quantity is in the range preferably from 0.1 to 10 J/cm$^2$, more preferably from 0.15 to 8 J/cm$^2$, and further preferably from 0.2 to 5 J/cm$^2$.

In the case of curing, for example, by an electron beam, an electron beam having an acceleration voltage in the range of preferably 10 to 500 kV, more preferably 20 to 300 kV, further preferably 30 to 200 kV may be used. The irradiation quantity is in the range of preferably 2 to 500 kGy, more preferably 3 to 300 kGy, further preferably 4 to 200 kGy. Together with an electron beam, heat by infrared ray, far infrared ray, hot air, high frequency heating and the like can also be used together.

As the application method in the case of applying the curable resin composition of the present invention on a base material and curing this to obtain a laminated body, conventionally known methods may be selected depending on the use object thereof, such as various printing methods such as gravure printing and the like, a bar coater method, a spin coater method, hand painting methods such as brush painting and the like, a spray painting method, an immersion method and the like. Regarding the application amount, the upper limit is preferably 1,000 g/m$^2$, more preferably 700 g/m$^2$ and the lower limit is preferably 0.2 g/m$^2$, more preferably 0.5 g/m$^2$. Regarding the application thickness, the upper limit is preferably 500 µm, more preferably 200 µm and the lower limit is preferably 1 µm, more preferably 2 µm.

As the method of forming a cured film layer using the curable resin composition of the present invention, there is a simultaneous molding and decorating method using a decorating film containing the curable resin composition. In this method, a decorating film constituted of at least a film and a decorating layer is placed in a metal mold for injection molding, the mold is closed, then, a molding resin is injected into a cavity, the molding resin is solidified to obtain a resin molded article, and a decorating sheet is adhered and integrated to the surface of the resin molded article, to obtain a simultaneously molded and decorated molded article.

Examples of the base material used in the above-described laminated body include resin molded products and films composed of polyethylene (PE), polypropylene (PP), polymethyl methacrylate (PMMA), poly acrylate, polyvinyl alcohol (PVA), polystyrene (PS), polyethylene terephthalate (PET), polybutylene terephthalate (PBT), ethylene-vinyl acetate copolymer (EVA), acrylonitrilestyrene (AS), acrylonitrile butadiene styrene copolymer (ABS), triacetyl cellulose (TAC), cycloolefin polymer (COP), polycarbonate (PC), polyether ether ketone (PEEK), polyamideimide (PAI), polyimide (PI), polyether amide (PEI), nylon (NY), polyvinyl chloride (PVC), polyvinylidene chloride, epoxy resin, urethane resin, silicone resin, and thermoplastic resins disclosed in Japanese Patent No. 2015632 Japanese Patent No. 3178733, JP-A No. 2001-151814 and JP-A No. 2007-70607, and the like; papers such as coated papers such as polyethylene coated paper, polyethylene terephthalate coated paper and the like, non-coated papers and the like; wood; glass; metals such as stainless, iron, aluminum, copper, zinc, zinc-plated steel, titanium, tin, chromium-molybdenum steel, alloy and the like; concrete, earthenware, FRP (glass fiber reinforced plastic), metal•glass•polymer fiber material, and the like. Of them, preferable are polyethylene terephthalate (PET), triacetyl cellulose (TAC), polymethyl methacrylate (PMMA), poly acrylate, cycloolefin polymer (COP), polycarbonate (PC) and heat resistant acryl.

On the above-described laminated body, various functional coating layers such as an antistatic layer, tackiness agent layer, adhesive layer, easily adhesive layer, strain relaxation layer, nonglare layer; antifouling layers such as photocatalyst layer and the like; antireflection layer, ultraviolet shielding layer, heat ray shielding layer, electromagnetic wave shielding layer, polarization layer, reflection layer, information recording layer, light transmission layer, magnetic layer, phase change layer, pigment layer, dielectric layer, metal vapor-deposited layer, waterproof layer, photosensitive layer, dressing layer, conductive layer, water repellent layer, oil repellent layer, detachability layer, coherent layer, high refractive index layer, low refractive index layer, gas barrier layer and the like may be each laminated and coated or vapor-deposited, in accordance with its object. The order of lamination of the cured film layer obtained by using the curable resin composition of the present invention, and respective layers, is not particularly restricted, and the lamination method thereof is also not particularly restricted.

The curable resin composition of the present invention can be applied to various materials such as crosslinking materials, hard coating materials, adhesives, sticking materials, dental materials, optical members, optical fibers, information recording materials, various resist materials (colored resist, photospacer, etching resist, solder resist and the like), binders for calcining paste, solid electrolytes, insulating materials, sealants, printing inks, paints, powder paints, cast molding materials, decorative sheets, WPC (Wood Plastic Combination), coating materials, lining materials, civil engineering and construction materials, putty, repair materials, floor materials, over coating materials, under coating materials, primers, molding materials such as hand lay up•spray up•pultrusion•SMC (Sheet Molding Compound)•BMC (Bulk Molding Compound) and the like, etc., and can be suitably used in the fields of optical recording media, plastic films, OA equipments, communication devices such as mobile telephone and the like, domestic electric appliances, automobile interior and exterior parts, domestic exterior members, plastic lenses, cosmetic vessels, beverage vessels, displays such as organic EL displays and the like, touch panels of home electric appliances and the like, sink cabinets, washing stands, further, show windows, windowpanes, and the like.

The cured product obtained by curing the curable resin composition of the present invention is excellent particularly in abrasion resistance and hardness, and excellent particularly in adhesion with a base material made of a plastic, metal and the like, thus, the curable resin composition of the present invention is used more suitably as a coating agent for optical recording medium, coating agent for film, coating agent for plastic molded article or primer agent.

The curable resin composition of the present invention is further suitably used as a coating agent for optical recording medium, and particularly suitably used as a coating agent for transparent cover layer of blu-ray disk, and a coating agent for transparent hard coating layer.

EXAMPLES

The present invention will be described more specifically by examples mentioned below, but the present invention is not essentially limited by the following example, and can be carried out with suitable changes in a range applicable to purposes described above and described later, and all of them are also included in the technological scope of the present invention.

First, measurements of the number average molecular weight (Mn) and the molecular weight distribution (Mw/Mn) of polymers in the present examples and comparative examples are explained.

<Number Average Molecular Weight and Molecular Weight Distribution>

The number average molecular weight (Mn) and the molecular weight distribution (Mw/Mn) of polymers in the present examples were measured by gel permeation chromatography (GPC) and reduced by polystyrene standards. The measurement conditions were as described below.

eluent: THF, temperature: 40° C., flow rate: 0.3 mL/min;
column: TSK-gel SuperHM-H (two)
TSK-gel SuperH2000 (one)
(both are manufactured by Tosoh Corporation);
measurement instrument: HLC-8220GPC (manufactured by Tosoh Corporation).

Next, Examples 1 to 5 and Comparative Examples 1 and 2 of polymers will be described.

Example 1

Into a four-necked flask equipped with a stirring bar, thermometer, dropping funnel and nitrogen/air mixed gas line was added 80 g of ethyl acetate, and this was heated up to 40° C. After rising of temperature, a mixture of 128 g of 2-(2-vinyloxyethoxy)ethyl acrylate (VEEA) and 72 g of 2,3-dihydrofuran (DHF), and a dissolved mixture of 13 g of ethyl acetate and 13 mg of phosphotungstic acid were dropped respectively over a period of 2 hours, and polymerization thereof was carried out. After completion of the polymerization, triethylamine was added to stop the reaction.

Next, the polymer solution was concentrated by an evaporator, then, a polymer (P(VEEA/DHF)-1) as the polymer (A) was obtained. The reaction rate of monomers was found to be 99.1%, by analyzing the mixed solution after stop of the reaction by gas chromatography (GC). The resultant polymer (P(VEEA/DHF)-1) had a number average molecular weight (Mn) of 9840 and a molecular weight distribution (Mw/Mn) of 1.97.

Example 2

Into a four-necked flask equipped with a stirring bar, thermometer, dropping funnel and nitrogen/air mixed gas line was added 80 g of ethyl acetate, and this was heated up to 20° C. After rising of temperature, a mixture of 81 g of VEEA, 109 g of cyclohexyl vinyl ether (CHVE) and 10 g of DHF, and a dissolved mixture of 13 g of ethyl acetate and 13 mg of phosphotungstic acid were dropped respectively over a period of 2 hours, and polymerization thereof was carried out. After completion of the polymerization, triethylamine was added to stop the reaction.

Next, the polymer solution was concentrated by an evaporator, then, a polymer (P(VEEA/CHVE/DHF)-1) was obtained. The reaction rate of monomers was found to be 99.1%, by analyzing the mixed solution after stop of the reaction by gas chromatography (GC). The resultant polymer (P(VEEA/CHVE/DHF)-1) had a number average molecular weight (Mn) of 8060 and a molecular weight distribution (Mw/Mn) of 1.66.

Example 3

Into a four-necked flask equipped with a stirring bar, thermometer, dropping funnel and nitrogen/air mixed gas line was added 80 g of ethyl acetate, and this was heated up to 20° C. After rising of temperature, a mixture of 196 g of VEEA and 4 g of DHF, and a dissolved mixture of 13 g of ethyl acetate and 13 mg of phosphotungstic acid were dropped respectively over a period of 2 hours, and polymerization thereof was carried out. After completion of the polymerization, triethylamine was added to stop the reaction.

Next, the polymer solution was concentrated by an evaporator, then, a polymer (P(VEEA/DHF)-2) was obtained. The reaction rate of monomers was found to be 99.0%, by analyzing the mixed solution after stop of the reaction by gas chromatography (GC). The resultant polymer (P(VEEA/DHF)-2) had a number average molecular weight (Mn) of 9800 and a molecular weight distribution (Mw/Mn) of 2.50.

Example 4

Into a four-necked flask equipped with a stirring bar, thermometer, dropping funnel and nitrogen/air mixed gas line was added 80 g of ethyl acetate, and this was heated up to 20° C. After rising of temperature, a mixture of 107 g of VEEA and 93 g of DHF, and a dissolved mixture of 13 g of ethyl acetate and 13 mg of phosphotungstic acid were dropped respectively over a period of 2 hours, and polymerization thereof was carried out. After completion of the polymerization, triethylamine was added to stop the reaction.

Next, the polymer solution was concentrated by an evaporator, then, a polymer (P(VEEA/DHF)-3) was obtained. The reaction rate of monomers was found to be 99.0%, by analyzing the mixed solution after stop of the reaction by gas chromatography (GC). The resultant polymer (P(VEEA/DHF)-3) had a number average molecular weight (Mn) of 10420 and a molecular weight distribution (Mw/Mn) of 2.06.

Example 5

Into a four-necked flask equipped with a stirring bar, thermometer, dropping funnel and nitrogen/air mixed gas line was added 80 g of ethyl acetate, and this was heated up to 20° C. After rising of temperature, a mixture of 88 g of VEEA, 79 g of CHVE and 33 g of DHF, and a dissolved mixture of 13 g of ethyl acetate and 13 mg of phosphotungstic acid were dropped respectively over a period of 2 hours, and polymerization thereof was carried out. After completion of the polymerization, triethylamine was added to stop the reaction.

Next, the polymer solution was concentrated by an evaporator, then, a polymer (P(VEEA/CHVE/DHF)-2) was obtained. The reaction rate of monomers was found to be 99.1%, by analyzing the mixed solution after stop of the reaction by gas chromatography (GC). The resultant polymer (P(VEEA/CHVE/DHF)-2) had a number average molecular weight (Mn) of 6360 and a molecular weight distribution (Mw/Mn) of 1.69.

Comparative Example 1

Into a four-necked flask equipped with a stirring bar, thermometer, dropping funnel and nitrogen/air mixed gas line was added 80 g of ethyl acetate, and this was heated up to 40° C. After rising of temperature, a mixture of 99 g of VEEA and 101 g of CHVE, and a dissolved mixture of 13 g of ethyl acetate and 13 mg of phosphotungstic acid were dropped respectively over a period of 2 hours, and polymerization thereof was carried out. After completion of the polymerization, triethylamine was added to stop the reaction.

Next, the polymer solution was concentrated by an evaporator, then, a polymer (P(VEEA/CHVE)-1) was obtained. The reaction rate of monomers was found to be 99.1%, by analyzing the mixed solution after stop of the reaction by gas chromatography (GC). The resultant polymer (P(VEEA/CHVE)-1) had a number average molecular weight (Mn) of 2100 and a molecular weight distribution (Mw/Mn) of 2.12.

Comparative Example 2

Into a four-necked flask equipped with a stirring bar, thermometer, dropping funnel and nitrogen/air mixed gas line was added 80 g of ethyl acetate, and this was heated up to 20° C. After rising of temperature, 200 g of VEEA, and a dissolved mixture of 13 g of ethyl acetate and 13 mg of phosphotungstic acid were dropped respectively over a period of 2 hours, and polymerization thereof was carried out. After completion of the polymerization, triethylamine was added to stop the reaction.

Next, the polymer solution was concentrated by an evaporator, then, a polymer (P(VEEA)-1) was obtained. The reaction rate of monomers was found to be 99.1%, by analyzing the mixed solution after stop of the reaction by gas chromatography (GC). The resultant polymer (P(VEEA)-1) had a number average molecular weight (Mn) of 2610 and a molecular weight distribution (Mw/Mn) of 1.86.

The feeding weight ratios of raw materials of the polymers in Examples 1 to 5 and Comparative Examples 1 and 2 described above, the feeding rates of VEEA and DHF, the number average molecular weights (Mn), the molecular weight distributions (Mw/Mn) and the temperatures are shown in Table 1 described below.

Table 1 teaches that the polymer (A) of the present invention has high molecular weights of 6000 or more by introduction of a cyclic ether skeleton derived from a cyclic ether compound (DHF) represented by the above-described general formula (2), and various molecular weights are obtained by setting the above-described raw material feeding weight ratio at a proper value.

As described above, it was confirmed that the polymer (A) of the present invention is produced without setting the reaction temperature at a low temperature, and the molecular weight can be controlled easily in accordance with the object.

Examples 3 and 4 described above and Comparative Examples 5 to 6 described later, are as described below.

<Coatability>

Coatability was measured by visually observing an applied layer of a curable resin composition in spin coating (before curing), according to the following criterion.

○: uniformly applied on the whole surface of a laminated body, and bubbles and flow tracks are not observed Δ: flow tracks are observed in a small portion of a laminated body X: a lot of flow tracks and bubbles are observed on a laminated body <Curability>

A curable resin composition was ultraviolet-cured using UV irradiator (manufactured by Eye Graphics Co., Ltd.) having an extra high pressure mercury lamp, and the irradiated accumulated light quantity was changed to 100, 250 and 500 mJ/cm$^2$ and surface curability was evaluated by finger touch.

○ tack free

Δ fingerprint adheres

X un-cured

<Light Transmittance>

The light transmittance at 400 nm of a cured product having a thickness of 100 μm obtained by ultraviolet-curing was measured using a spectral photometer (type UV-3100, manufactured by Shimadzu Corp.).

<Pencil Hardness>

The pencil hardness was measured on the surface of a laminated body using Pencil Scratch Hardness Tester (manufactured by Yasuda. Seiki Seisakusho Ltd.) according to JIS-K5400. The load was 1000 g.

<Warpage>

A 12 cm×12 cm laminated body was placed on a horizontal table so that the cured product layer faced upward under condition of a temperature of 25° C., then, the average value of floating heights of four corners from the horizontal table was measured, and evaluated according to the following criterion.

○: less than 1 mm

X: 1 mm or more

Examples 6 to 10 and Comparative Example 3 to 6 are described in detail below.

Example 6

The polymer obtained in Example 1 (P(VEEA/DHF)-1) (82 parts by weight), tetrahydrofurfuryl acrylate (trade name

TABLE 1

|  | EXAMPLE 1 | EXAMPLE 2 | EXAMPLE 3 | EXAMPLE 4 | EXAMPLE 5 | COMPARATIVE EXAMPLE 1 | COMPARATIVE EXAMPLE 2 |
|---|---|---|---|---|---|---|---|
| VEEA (wt %) | 64 | 40.5 | 98 | 53.5 | 44 | 49.5 | 100 |
| DHF (wt %) | 36 | 5 | 2 | 46.5 | 16.5 | — | — |
| CHVE (wt %) | — | 54.5 | — | — | 39.5 | 50.5 | — |
| VEEA/DHF | 1.78 | 8.1 | 49 | 1.15 | 2.67 | — | — |
| Mn | 9840 | 8060 | 9800 | 10420 | 6360 | 2100 | 2610 |
| Mw/Mn | 1.97 | 1.66 | 2.50 | 2.06 | 1.69 | 2.12 | 1.86 |
| REACTION TEMPERATURE (° C.) | 40 | 20 | 20 | 20 | 20 | 40 | 20 |

Next, curable resin compositions containing respectively the polymers in Examples 1 to 5 and Comparative Examples 1 and 2 described above were applied on base materials, and cured to produce laminated bodies (articles) that cured products were laminated on base materials (Examples 6 to 10, Comparative Examples 3 to 4). Methods of evaluating coatability, curability, and physical properties of cured products such as light transmittance, pencil hardness and warpage of cured products in Examples 6 to 10 and Comparative "Light Acrylate THF-A", manufactured by Kyoeisha Chemical Co., Ltd.) (9 parts by weight), 1,9-nonanediol diacrylate (trade name "Light Acrylate 1.9ND-A", manufactured by Kyoeisha Chemical Co., Ltd.) (9 parts by weight), and photopolymerization initiator 1-hydroxycyclohexylphenyl ketone (trade name "Irgacure 184", manufactured by Ciba Specialty Chemicals) (2 parts by weight) were mixed and stirred to prepare a coating solution (curable resin composition).

This was applied by a spin coater on a polycarbonate (PC) plate having a length of 12 cm, a width of 12 cm and a thickness of 1 mm. This applied resin layer was ultraviolet-cured using UV irradiator (manufactured by Eye Graphics Co., Ltd.) having an extra high pressure mercury lamp.

The thickness of the coating layer (cured product) of the resultant laminated body was measured to find a value of 100 μm.

The results of the above-described evaluations on the cured product in Example 6 are shown in Table 2 described below.

Table 2 teaches that the laminated bodies of Examples 6, 8 and 9 obtained by using a curable resin composition containing a polymer obtained by polymerizing a vinyl monomer represented by the general formula (1) and a cyclic ether compound represented by the general formula (2), and the laminated bodies of Examples 7 and 10 obtained by using a curable resin composition containing a polymer obtained by further polymerizing also other cationic polymerizable monomer are excellent in coatability, curability, light transmittance, pencil hardness and warpage suppressability.

TABLE 2

|  | EXAMPLE 6 | EXAMPLE 7 | EXAMPLE 8 | EXAMPLE 9 | EXAMPLE 10 | COMPARATIVE EXAMPLE 3 | COMPARATIVE EXAMPLE 4 | COMPARATIVE EXAMPLE 5 | COMPARATIVE EXAMPLE 6 |
|---|---|---|---|---|---|---|---|---|---|
| COATABILITY | ○ | ○ | ○ | ○ | ○ | ○ | ○ | Δ | X |
| CURABILITY |  |  |  |  |  |  |  |  |  |
| 100 mJ/cm$^2$ | Δ | Δ | Δ | Δ | Δ | X | X | Δ | Δ |
| 250 mJ/cm$^2$ | ○ | ○ | ○ | ○ | ○ | X | Δ | ○ | Δ |
| 500 mJ/cm$^2$ | ○ | ○ | ○ | ○ | ○ | Δ | ○ | ○ | ○ |
| PHYSICAL PROPERTIES OF A CURED PRODUCT |  |  |  |  |  |  |  |  |  |
| LIGHT TRNSMITTANCE (%) | 90 | 90 | 90 | 90 | 90 | 90 | 90 | 90 | 90 |
| PENCIL HARDNESS | 2 H | 2 H | 2 H | 2 H | 2 H | 2 H | 2 H | 3 H | 2 H |
| WARPAGE | ○ | ○ | ○ | ○ | ○ | ○ | ○ | X | X |

Examples 7 to 10, Comparative Examples 3 and 4

Laminated bodies of Examples 7 to 10 and Comparative Examples 3 and 4 were obtained in the same manner as in Example 6, excepting the polymer (P(VEEA/CHVE/DHF)-1), polymer (P(VEEA/DHF)-2), polymer (P(VEEA/DHF)-3), polymer (P(VEEA/CHVE/DHF)-2), polymer (P(VEEA/CHVE)-1) and polymer (P(VEEA)-1) obtained in Examples 2 to 5 and Comparative Examples 1 and 2 were used instead of the polymer (P(VEEA/DHF)-1) used in Example 6.

The results of the above-described evaluations on the cured products in Examples 7 to 10 and Comparative Examples 3 and 4 are shown in Table 2 described above.

Comparative Example 5

A laminated body of Comparative Example 5 was obtained in the same manner as in Example 6 excepting that dipentaerythritol hexaacrylate (trade name "Light Acrylate DPE-6A", manufactured by Kyoeisha Chemical Co., Ltd.) was used instead of the polymer (P(VEEA/DHF)-1) used in Example 6.

The results of the above-described evaluations on the cured product in Comparative Example 5 are shown in Table 2 described above.

Comparative Example 6

A laminated body of Comparative Example 6 was obtained in the same manner as in Example 6 excepting that a urethane acrylate resin (trade name "NK Oligo U-15HA", manufactured by Shin-Nakamura Chemical Co., Ltd.) was used instead of the polymer (P(VEEA/DHF)-1) used in Example 6.

The results of the above-described evaluations on the cured product in Comparative Example 6 are shown in Table 2 described above.

In contrast, it is understood that the conventional laminated bodies of Comparative Examples 5 and 6 obtained by using a curable resin composition containing an acrylate oligomer are poor in coatability and warpage suppressability, further, the laminated bodies of Comparative Example 5 and 6 are poor in curability.

Moreover, it is understood that the laminated bodies of Comparative Examples 3 and 4 obtained by using a curable resin composition containing a polymer which does not contain a cyclic ether compound represented by the general formula (2) as a copolymerization component are poor in curability.

As described above, it was confirmed that when the polymer (A) of the present example is contained in a curable resin composition which is then applied and cured on a plastic base material, a cured product is obtained in which the coated film has high surface hardness and hardly suffers from scratch, and warpage and curl of the laminated body and crack and peeling of the coated film scarcely occur, adhesion with a plastic base material is excellent, and light transmittance thereof is excellent; and an article obtained by laminating said cured product is obtained.

Next, curable resin compositions containing the above-described polymer (P(VEEA/DHF)-1) in Example 1 and a polymer (PMMA) described below respectively were coated on a base material and cured to form a primer layer, further, a resin composition for top coating was coated on this primer layer and cured to form a top coating layer, producing laminated bodies (articles) (Example 11 and Comparative Example 7).

A method for evaluating the adhesion of these laminated bodies is as described below.

<Adhesion>

According to JIS K5600-5-6, 100 grids (the size of a grid: 1 mm×1 mm) were made on a cured product layer by a cutter knife, a cellophane sticky tape (Cellotape manufactured by Nichiban Co., Ltd. (registered trademark)) was press-bonded, then, and the Cellotape was peeled at one stroke. Its appearance according to visual observation after peeling was evaluated according to the following criterion.

◯: Detachment is not observed in all 100 grids.

X: Detachment is observed in a part of the grid

Preparation of the resin composition for top coating layer, Example 11, synthesis of PMMA syrups for Comparative Example 7, and Comparative Example 7 are described in detail below.

[Preparation of Resin Composition for Top Coating Layer]

30 parts by weight of dipentaerythritol hexaacrylate, 35 parts by weight the urethane acrylate used in Comparative Example 6, 30 parts by weight VEEA, 5 parts by weight of N-vinylpyrrolidone (manufactured by Nippon Shokubai Co., Ltd.), and 5 parts by weight of a photopolymerization initiator 2-methyl-1-[4-(methylthio)phenyl]-2-morpholinopropan-1-one (trade name "Irgacure 907", manufactured by Ciba Specialty Chemicals) were mixed and stirred to prepared a resin composition for top coating layer.

Example 11

23 parts by weight of the polymer (P(VEEA/DHF)-1) obtained in Example 1, 77 parts by weight of methyl methacrylate, 1 part by weight of a phosphate ester trade name "LIGHT ESTER P-1M", manufactured by Kyoeisha Chemical Co., Ltd.), 6 parts by weight of a polymerization initiator (trade name "NIPER FF", manufactured by NOF Corporation), 1 part by weight of a curing accelerator (N,N-dimethyl-p-toluidine), and 0.1 part by weight of Paraffin Wax 140 (manufactured by NIPPON SEIRO Co., Ltd.) were mixed and stirred to prepare a coating solution (curable resin composition).

A surface sand blasted article (manufactured by Nippon Testpanel Co., Ltd.) of a steel plate SS400 (JIS G3101) was subjected to a degreasing treatment with acetone, and the above-described curable resin composition was applied by a roller on the steel plate so that the attached amount of the coating solution was 0.1 kg/m$^2$, and the resin layer (primer layer) was left and cured. For evaluation of the quick drying property of the above-described curable resin composition, the coating solution and the steel plate were temperature-controlled to 5° C., curing was performed at 5° C., and the degree of curing and drying of the resin layer was confirmed by finger touch, and the time until drying was measured. As a result, the time until drying was 10 minutes, and it was evaluated that a quick drying property was recognized.

On the surface of the resin layer of this steel plate/resin layer obtained by drying, the resin composition for top coating layer prepared above was coated. Next, the top coating layer was ultraviolet-cured using UV irradiator (manufactured by Eye Graphics Co., Ltd.). The irradiated accumulated light quantity was 500 m J/cm$^2$ and the thickness of the top coating layer after curing was 5 μm.

Evaluation of the adhesion of this steel plate/cured product layer (resin layer (primer layer)+top coating layer) was carried out by the above-described method, to find no peeling.

The results of evaluation of the quick drying property and the adhesion are shown in Table 3 described below.

TABLE 3

|  | EXAMPLE 11 | COMPARATIVE EXAMPLE 8 |
| --- | --- | --- |
| QUICK DRYING PROPERTY | ◯ | X |
| ADHESION | ◯ | ◯ |

[Synthesis of PMMA Syrup for Comparative Example 7]

Into a vessel equipped with a thermometer, cooling tube, gas introduction tube and stirring machine was charged 100 parts by weight of methyl methacrylate, and an atmosphere in the reactor was purged with a nitrogen gas. Then, the temperature was raised to 80° C. while stirring, and 0.1 part by weight azoisobutyronitrile and 1.4 parts by weight of n-dodecylmercaptan (chain transfer agent) were added, and polymerization thereof was performed for 3.5 hours. Air was blown into the reactor and simultaneously 0.01 part by weight of hydroquinone was added, to stop the polymerization. By this, a PMMA syrup for a comparative example having a solid concentration of 46% was obtained. The resultant polymer (PMMA) had an average molecular weight of 15300 and a molecular weight distribution (Mw/Mn) of 1.70.

Comparative Example 7

50 parts by weight of the above-described PMMA syrup, 50 parts by weight of methyl methacrylate, 1 part by weight of a phosphate ester (trade name "LIGHT ESTER P-1M", manufactured by Kyoeisha Chemical Co., Ltd.), 6 parts by weight of a polymerization initiator (trade name "NIPER FF", manufactured by NOF Corporation), 1 part by weight of a curing accelerator (N,N-dimethyl-p-toluidine), and 0.1 part by weight of Paraffin Wax 140 (manufactured by NIPPON SEIRO Co., Ltd.) were mixed and stirred to prepare a coating solution (curable resin composition) for Comparative Example 7.

This was applied on a steel plate at 5° C. in the same manner as in Example 11, and the comparative resin layer (primer layer) was left and cured. The time until drying was measured to find 90 minutes, that is, a longer time was necessary for drying as compared with Example 11.

On the surface of the resin layer of this steel plate/comparative resin layer obtained by drying, the resin composition for top coating layer prepared above was coated. Next, the top coating layer was ultraviolet-cured using UV irradiator (manufactured by Eye Graphics Co., Ltd.). The irradiated accumulated light quantity was 500 m J/cm$^2$ and the thickness of the top coating layer after curing was 5 μm.

Evaluation of the adhesion of this steel plate/cured product layer (comparative resin layer (primer layer)+top coating layer) was carried out, to find no peeling.

The results of evaluation of the quick drying property and the adhesion are shown in Table 3 described above.

As described above, it was confirmed that if the polymer (A) of the present example is contained in a curable resin composition, the composition is applied on a base material made of a metal and cured to form a primer layer, further, a top coating layer is formed on the primer layer, then, this cured product shows good adhesion to a base material. It was also confirmed that the curable resin composition of the present example has a good quick drying property as compared with conventional resin compositions for primer.

Industrial Applicability

The polymer of the present invention contains a radical polymerizable unsaturated group in a side chain, and its molecular weight can be adjusted depending on the object, and the curable resin composition of the present invention containing the polymer of the present invention has low resin viscosity and manifests good handling, has excellent close adhesion with a base material, and is capable of providing a cured product layer that hardly suffers from scratch, has small cured shrinkage ratio, and has high transparency, that is, the polymer of the present invention is very useful for formation of a transparent cover layer, a primer layer and an intermediate layer of an article such as an optical recording medium and the like, or for pasting thereof.

The invention claimed is:

1. A polymer obtained from at least a vinyl monomer represented by the following general formula (1) and a cyclic ether compound represented by the following general formula (2)

(formula 1)

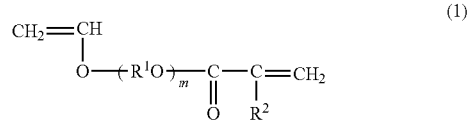

wherein $R^1$ represents an alkylene group having 2 to 8 carbon atoms, $R^2$ represents a hydrogen atom or a methyl group, and m represents a positive integer;

(formula 2)

wherein n represents an integer of 1 to 5.

2. The polymer according to claim 1, obtained by polymerizing 1 wt % or more and 99.9 wt % or less of the vinyl monomer represented by the above-described general formula (1), 0.1 wt % or more and 99 wt % or less of the cyclic ether compound represented by the above-described general formula (2), and 0 wt % or more and 98.9 wt % or less of other cationic polymerizable monomer.

3. The polymer according to claim 1, wherein the weight ratio of the vinyl monomer represented by the above-described general formula (1) to the cyclic ether compound represented by the above-described general formula (2) is in the range from 50/50 to 99.9/0.1.

4. The polymer according to claim 2, wherein the weight ratio of the vinyl monomer represented by the above-described general formula (1) to the cyclic ether compound represented by the above-described general formula (2) is in the range from 50/50 to 99.9/0.1.

5. A curable resin composition, comprising the polymer as described in claim 1.

6. A curable resin composition, comprising the polymer as described in claim 2.

7. A curable resin composition, comprising the polymer as described in claim 3.

8. A curable resin composition, comprising the polymer as described in claim 4.

9. A cured product obtained by curing the curable resin composition as described in claim 5.

10. A cured product obtained by curing the curable resin composition as described in claim 6.

11. A cured product obtained by curing the curable resin composition as described in claim 7.

12. A cured product obtained by curing the curable resin composition as described in claim 8.

13. An article obtained by laminating the cured product as described in claim 9.

14. An article obtained by laminating the cured product as described in claim 10.

15. An article obtained by laminating the cured product as described in claim 11.

16. An article obtained by laminating the cured product as described in claim 12.

* * * * *